United States Patent [19]

Dotson et al.

[11] 4,333,913

[45] * Jun. 8, 1982

[54] METHOD OF PURIFYING AQUEOUS SOLUTIONS OF METAL HYDROXIDES

[75] Inventors: Ronald L. Dotson; Edward P. Carr, both of Cleveland, Tenn.

[73] Assignee: Olin Corporation, New Haven, Conn.

[*] Notice: The portion of the term of this patent subsequent to Apr. 7, 1998, has been disclaimed.

[21] Appl. No.: 179,147

[22] Filed: Aug. 18, 1980

Related U.S. Application Data

[63] Continuation of Ser. No. 965,818, Dec. 4, 1978, Pat. No. 4,260,494.

[51] Int. Cl.$^3$ ................................................ C01D 1/36
[52] U.S. Cl. .................................... 423/184; 210/914; 210/721; 204/99
[58] Field of Search ............... 210/759, 914, 721, 912; 204/99; 423/184

[56] References Cited

U.S. PATENT DOCUMENTS

| | | | |
|---|---|---|---|
| 3,674,428 | 7/1972 | Dean et al. | 210/914 X |
| 3,764,495 | 10/1973 | Guptill et al. | 204/99 |
| 3,764,496 | 10/1973 | Hultman et al. | 204/99 |
| 4,147,626 | 4/1979 | Findlay et al. | 210/914 X |
| 4,260,494 | 4/1981 | Dotson et al. | 210/721 |

FOREIGN PATENT DOCUMENTS

| | | | |
|---|---|---|---|
| 2230367 | 1/1973 | Fed. Rep. of Germany | 210/914 |

*Primary Examiner*—Thomas G. Wyse
*Attorney, Agent, or Firm*—Donald F. Clements; James B. Haglind

[57] ABSTRACT

A process is disclosed for purifying aqueous solutions of metal hydroxides.

An aqueous solution of a metal hydroxide, such as sodium hydroxide, containing a complex of a heavy metal contaminant, such as mercury, is heated.

An oxidizing agent, such as hydrogen peroxide, is reacted with the solution to precipitate solid particles of an oxide of the heavy metal, for example, mercuric oxide, in a solution. The solid particles of mercuric oxide are separated from the solution by filtration.

The purified solution comprised of water and sodium hydroxide and containing less than about 0.3 part per million mercury by weight is sold commercially. The solid particles of mercuric oxide are landfilled or otherwise utilized.

14 Claims, No Drawings

METHOD OF PURIFYING AQUEOUS SOLUTIONS OF METAL HYDROXIDES

This is a continuation, of application Ser No. 965,818, filed Dec. 4, 1978, now U.S. Pat. No. 4,260,494.

The present invention relates to a method for purifying aqueous solutions of alkali metal hydroxides and alkaline earth metal hydroxides by removing heavy metal contaminants and chemical groups which form complexes with the same. More particularly, the present invention relates to a method for purifying an aqueous solution of sodium hydroxide by removing mercury contaminants and sulfides.

Heavy metal contaminants, such as mercury, are objectionable in most chemical processes and preparations involving sodium hydroxide. Various methods have been employed to remove heavy metal contaminants, such as mercury, from aqueous solutions of sodium hydroxide.

U.S. Pat. No. 3,502,434, issued to John Buchanan MacMillan on Mar. 24, 1970, discloses a process and apparatus for removing mercury from mercury cell liquor. Crude liquor is passed through a composite bed of particulate material, such as polyethylene shreds, polytetrafluoroethylene shreds, graphite, charcoal, and preferably activated carbon, and a metal such as nickel, stainless steel or tantalum. The bed is back washed periodically with water to recover mercury.

U.S. Pat. No. 3,600,285, issued to Edward J. Botwick and Darrell R. Smith on Aug. 17, 1971, discloses a process for the removal of mercury chloride from weak brine effluent from mercury cathode electrolytic cells. The effluent contacts activated carbon. The activated carbon is water washed and then heated in a steam of inert gas. The mercury chloride is condensed by cooling the inert gas stream.

U.S. Pat. No. 3,764,495, issued to Joel P. Guptill and Gary W. Foley on Oct. 9, 1973, discloses a method for removing mercury from a mercury cell liquor and caustic potash solution wherein a vapor is passed through the solution in the presence of a small amount of a reducing agent.

In spite of these methods, a long felt need has remained in the industry for a method of sufficiently purifying aqueous solutions of sodium hydroxide, such as mercury cell caustic, without employing additional and often costly process equipment.

However, the process of this invention may now be employed to sufficiently purify aqueous solutions of sodium hydroxide by removing mercury contaminant and chemical groups which complex with the same by employing minimum process equipment without adding undesirable foreign chemical material to the product.

OBJECTS

It is a primary object of the present invention to provide an inexpensive, simple, and efficient method for purifying aqueous solutions of metal hydroxides.

It is another object of the present invention to provide an inexpensive, simple, and efficient method for removing mercury from aqueous solutions of sodium hydroxides produced as mercury cell caustic in mercury cells.

A further object of this invention is to provide an aqueous solution of sodium hydroxide which contains less than about 0.3 part per million of mercury by weight.

BRIEF DESCRIPTION OF THE INVENTION

The foregoing objects of the invention are accomplished in a method for sufficiently purifying an aqueous solution of metal hydroxide containing a complex of a heavy metal as a contaminant which comprises heating the solution to a temperature of at least 25° C., reacting an oxidizing agent with the solution to precipitate solid particles of an oxide of the heavy metal in the solution, and separating the solid particles from the solution.

DETAILED DESCRIPTION OF THE INVENTION

Aqueous solutions of metal hydroxides which may be purified by the process of this invention include aqueous solutions of sodium hydroxide, potassium hydroxide, lithium hydroxide and mixtures thereof, having a concentration in the range from about 5 to about 95% by weight metal hydroxide.

As used throughout the description and claims, the term "heavy metal" is defined as any metal which is capable of combining with a complexing group to form a heavy metal complex of the form $[MC]C^=$, where M is any heavy metal selected from a group consisting of mercury, arsenic, antimony, bismuth, tin and mixtures thereof, where C is a "complexing group" or any electron donor either ionic or nonionic and capable of combining with M, the heavy metals previously described, to form a complex of the type $[MC]C^=$.

Mercury cells usually consist of an enclosed, elongated trough which slopes slightly toward one end. The cathode is a flowing layer of mercury which is introduced at the higher end of the cell and flows along the bottom of the cell toward the lower end. The anodes are generally composed of rectangular blocks of graphite suspended from conductive lead-ins so that the bottom of the graphite anode is spaced a short distance above the flowing mercury cathode. An aqueous electrolytic solution, for example, a brine of sodium chloride is fed to the upper end of the cell, covering the anodes and flowing concurrently with the mercury. The impressed electric current passing through the electrolytic solution between the anodes and the mercury cathode liberates chlorine at the anodes and sodium is dissolved in the mercury as an amalgam. The sodium amalgam flows from the lower end of the cell to a decomposer where it is contacted with water to form an aqueous solution of sodium hydroxide, commonly known as mercury cell caustic, hydrogen and mercury.

A typical aqueous solution of metal hydroxide containing heavy metals and complexing agents as contaminants which may be purified according to the process of this invention is an aqueous solution of sodium hydroxide produced as an effluent from the mercury cell known as mercury cell caustic. The same purification may be applied to other aqueous solutions containing contaminant heavy metals, but for simplicity, the process of this invention is hereafter described more particularly with respect to the purification of mercury cell caustic. Such description is not to be construed as limiting the usefulness of the invention or the scope of the appended claims.

The pH of the aqueous solution of mercury cell caustic is in the range from about 7 to about 14 and preferably in the range from about 8 to about 13.

The concentration of sodium hydroxide in the mercury cell caustic is in the range from about 25 to about 75 and preferably in the range from about 40 to about 60% by weight sodium hydroxide.

In addition to containing sodium hydroxide, the mercury cell caustic may contain small concentrations of heavy metals, such as mercury.

In normal mercury cell plant operation, a small percentage of heavy metals, such as mercury, is reacted to the ionic state and combined with other elements, for example, sulfur, in the form of sulfide, $S^=$, to form compounds, such as mercuric sulfide, HgS. Heavy metal sulfides, such as mercuric sulfide, are relatively insoluble in the mercury cell caustic and may be recovered therefrom by conventional methods, for example, filtration, coalescence, absorption and the like.

Without being bound by theory, it is believed that the relatively insoluble heavy metal sulfur compounds previously described may further combine with additional sulfur to form a heavy metal polysulfide complex of the form $[HgS]S^=$, where M is a heavy metal as previously defined. For example, mercuric sulfide, HgS, may further combine with additional sulfur in the form of sulfides to form a mercury polysulfide complex of the form $[HgS]S^=$. The mercuric polysulfide complex is highly soluble in the mercury cell caustic in sharp contrast to the relative insoluble mercuric sulfide, HgS.

In the process of this invention, mercury cell caustic as described above contaminated with a complex of a heavy metal such as mercuric polysulfide in the range from about 2 to about 100 parts per million of mercury is heated by conventional means, such as with steam to a temperature of at least 25° C.

Preferably, after heating, the mercury cell caustic temperature is in the range from about 50° C. to about 125° C.

The heating may be conducted under atmospheric, subatmospheric or superatmospheric, but is preferred to conduct the heating, for reasons of economy, at atomspheric or at slight super- or subatmospheric pressures.

After heating of the mercury cell caustic is complete, an oxidizing agent such as an organic peroxide compound, for example, hydrogen peroxide, is reacted with the soluble polysulfide complex of mercury present in the mercury cell caustic to form water, sodium sulfate, and mercuric oxide as represented by Equation (1):

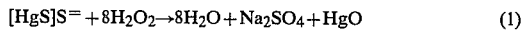

$$[HgS]S^= + 8H_2O_2 \rightarrow 8H_2O + Na_2SO_4 + HgO \quad (1)$$

Any oxidizing agent which is capable of oxidizing a heavy metal complex such as $[MC]=C$, as previously described, for example, the polysulfide complex to a sulfate ion may be employed.

Oxidizing agents which may be employed in the process of this invention include (i) alkali metal nitrates such as sodium nitrate, potassium nitrate, and mixtures thereof, (ii) alkaline earth metal nitrates such as calcium nitrate, magnesium nitrate, and mixtures thereof, (iii) alkali metal nitrites such as sodium nitrite, potassium nitrite and mixtures thereof, (iv) alkaline earth metal nitrites such as calcium nitrite, magnesium nitrite and mixtures thereof, (v) sodium peroxide, lead dioxide, and mixtures thereof, (vi) alkali metal peroxydisulfates such as sodium peroxydisulfate, potassium peroxydisulfate, and mixtures thereof, (vii) alkaline earth metal peroxydisulfates such as calcium peroxydisulfate, magnesium peroxydisulfate, and mixtures thereof, (viii) ozone, and (IX) mixtures of alkali metal nitrates, alkaline earth metal nitrates, alkali metal nitrites, alkaline earth metal nitrites, alkali metal peroxydisulfates, alkaline earth metal peroxydisulfates and ozone.

The molar ratio of oxidizing agent such as hydrogen peroxide to the heavy metal polysulfide complex, such as mercuric polysulfide in the liquid, is in the range from about 8:1 to about 20:1 and preferably in the range from about 10:1 to about 12:1 to assure complete conversion of all heavy metal polysulfide complex.

When admixed with the mercury cell caustic, the oxidizing agent is itself typically an aqueous solution, for example, an aqueous solution of hydrogen peroxide with a concentration of hydrogen peroxide in the range from about 1 to about 90 and preferably in the range from about 10 to about 50% by weight hydrogen peroxide. Organic solutions of hydrogen peroxide such as a solution of hydrogen peroxide in isopropyl acetate may be employed. However, when an organic solution of hydrogen peroxide is employed, the concentration of hydrogen peroxide is in the range from about 1 to about 50 and preferably in the range from about 10 to about 35% by weight.

The temperature of the oxidizing agent employed is in the range from about 10 to about 100, and preferably in the range from about 25° to about 50° C.

The pressure of the reaction is essentially atmospheric although subatmospheric or superatmospheric pressure may be employed.

The reaction period required for the completion of the reaction represented in Equation (1) is in the range from about 3 to about 20, and preferably in the range from about 5 to about 15 minutes.

Although not strictly required, suitable agitation means such as mechanical stirring, or aerating the liquid with a gas such as air, nitrogen oxygen, carbon dioxide and mixtures thereof, may be employed to facilitate the process of the reaction.

Completion of the reaction represented by Equation (1) results in the formation of a precipitate of solid particles of mercuric oxide, HgO, in a solution. The solution is comprised of water and sodium sulfate.

The solid particles of mercuric oxide are separated from the solution by any suitable solid-liquid separation technique, such as by filtration, centrifuging, settling, and the like. Filtration is the preferred form of solid-liquid separation although any other suitable solid-liquid separation technique may be employed. When filtration is employed, it is preferable to employ an inorganic or organic filter precoat such as a diatomaceous earth, a cellulosic-based material, or a silica-based microporous material.

The solid mercuric oxide particles separated from the solution contain a minimal amount of residual solution and may be disposed of as waste in, for example, a landfill, or otherwise utilized.

The purified solution produced by the separation contains concentrations of heavy metals, such as mercury, of less than about 0.3 part per million mercury, and is sold commercially or otherwise utilized.

Typically, a complexing agent is present within the aqueous solution of metal hydroxide employed in the process of this invention.

However, if desired, additional complexing agent may be employed by addition to the aqueous solution of metal hydroxide.

Complexing agents may include both inorganic and organic compounds.

Although sulfur in the form of sulfide ions is typically present in aqueous solution of metal hydroxides, such as mercury cell caustic, as described above, other inorganic complexing agents which may be employed in the process of this invention include (i) alkali metal thiosulfates such as sodium thiosulfate, potassium thiosulfate and mixtures thereof, (ii) alkaline earth metal thiosulfates such as calcium thiosulfate, magnesium thiosulfate and mixtures thereof, (iii) alklai metal thiocyanates such as sodium thiocyanate, potassium thiocyanate and mixtures thereof, (iv) alkaline earth metal thiocyanates such as calcium thiocyanate, magnesium thiocyanate and mixtures thereof, (v) alkali metal oxylates such as sodium oxylate, potassium oxylate and mixtures thereof, (vi) alkaline earth metal oxylates such as calcium oxylate, magnesium oxylate and mixtures thereof, (vii) alkali metal cyanides such as sodium cyanide, potassium cyanide and mixtures thereof, (viii) alkaline earth metal cyanides such as calcium cyanide, magnesium cyanide and mixtures thereof, (ix) alkali metal sulfides such as sodium sulfide, potassium sulfide and mixtures thereof, (x) alkaline earth metal sulfides such as calcium sulfide, magnesium sulfide and mixtures thereof, (xi) alkali metal orthophosphates such as sodium orthophosphate, potassium orthophosphate and mixtures thereof, (xii) alkaline earth metal orthophosphates such as calcium orthophosphate, magnesium orthophosphate and mixtures thereof, (xiii) alkali metal pyrophosphates such as sodium pyrophosphate, potassium pyrophosphate and mixtures thereof, (xiv) alkaline earth metal pyrophosphate such as calcium pyrophosphate, magnesium pyrophosphate and mixtures thereof, (xv) alkali metal triphosphates such as sodium triphosphate, potassium triphosphate and mixtures thereof, (xvi) alkaline earth metal triphosphates such as calcium triphosphate, magnesium triphosphate and mixtures thereof, (xvii) mixtures of alkali metal thiosulfates, alkaline earth metal thiosulfates, alkali metal thiocyanates, alkaline earth metal thiocyanates, alkali metal oxylates, alkaline earth metal oxylates, alkali metal cyanides, alkaline earth metal cyanides, alkali metal sulfides, alkaline earth metal sulfides, alkali metal orthophosphates, alkaline earth metal orthophosphates, alkali metal pyrophosphates, alkaline earth metal pyrophosphates, alkali metal triphosphates and alkaline earth metal triphosphates.

Other complexing agents include ammonia, propylene diamine, triethanolamine, citric acid, glyconic acid, oxalic acid, glycine, $\alpha$-$\alpha'$-dipyridyl and mixtures thereof.

Preferred inorganic complexing agents include those selected from a group consisting of sulfur, sodium sulfide, potassium sulfide, sodium pyrophosphate, sodium triphosphate, and mixtures thereof.

Organic complexing agents include compounds selected from the group consisting of trimethylamine, tributylamine, triethylamine, tripropylamine and mixtures thereof.

Other organic complexing agents include compounds selected from the group consisting of trimethylphosphine, triethylphosphine, tripropylphosphine, tributylphosphine and mixtures thereof.

Another example of a suitable family of organic complexing agents include compounds selected from a group consisting of trimethylarsine, triethylarsine, tripropylarsine, and mixtures thereof.

Preferred organic complexing agents include complexing agents selected from a group consisting of ethylene diamine, ethylene diamine tetraacetic acid, ethylene diamine diacetic acid and mixtures thereof.

It is recognized that inorganic and organic complexing agents may be employed simultaneously, for example, these complexing agents selected from a group consisting of sulfur, sodium sulfide, potassium sulfide, sodium pyrophosphate, sodium triphosphate, ethylene diamine, ethylene diamine tetraacetic acid, ethylene diamine diacetic acid, and mixtures thereof.

Although reference has been made primarily to the treatment of relatively high concentrations of caustic solutions such as those obtained directly from the operation of electrolytic mercury cells, the method is also applicable to the removal of mercury contained in weak caustic solutions and effluents.

The following examples are presented to define the invention more fully without any intention of being limited thereby. All parts and percentages are by weight unless indicated otherwise.

EXAMPLE 1

About 1 part of an aqueous solution of hydrogen peroxide containing about 35 parts hydrogen peroxide at a temperature of about 25° C. was reacted with about 620 parts of an aqueous solution of sodium hydroxide containing about 44.8 parts sodium hydroxide, about 3.1 parts per million mercury, and about 3.3 parts per million sulfur. Without being bound by theory, it is believed that mercury and sulfur are present in the aqueous solution of sodium hydroxide as a mercuric polysulfide complex.

The temperature of the aqueous solution of sodium hydroxide was about 50° C.

The solution was hand stirred at a temperature of about 50° C. for about 5 minutes. A precipitate of solid particles was formed in the solution.

The precipitate of solid particles in the liquid was then filtered through a laboratory filter precoated with a diatomaceous earth to separate the solid and the purified solution.

The purified solution was found by analysis to contain about 44.6 parts sodium hydroxide, about 1.6 parts per million mercury and about 0.7 part per million sulfur.

EXAMPLE 2

Conditions were the same in Example 2 as in Example 1, except that the same aqueous solution of sodium hydroxide containing about 45.3 parts sodium hydroxide was heated to about 75° C. before the aqueous hydrogen peroxide was admixed therewith.

The liquid solution was found by analysis to contain about 45.3 parts sodium hydroxide, about 1.5 parts per million mercury and about 0.7 part per million sulfur.

EXAMPLE 3

Conditions were the same in Example 3 as in Example 1, except that the same aqueous solution of sodium hydroxide was heated to about 100° C. before the aqueous hydrogen peroxide was admixed therewith.

The liquid solution was found by analysis to contain about 45.7 parts sodium hydroxide, about 0.4 part per million mercury and about 0.9 part per million sulfur.

EXAMPLE 4

Conditions were the same in Example 4 as in Example 1, except that the solution was hand stirred at a temperature of about 100° C. for about 10 minutes.

The liquid solution was found by analysis to contain about 46.18 parts sodium hydroxide, about 0.29 part per million mercury.

EXAMPLE 5

Conditions were the same in Example 5 as in Example 1, except that the solution was hand stirred at a temperature of about 100° C. for about 15 minutes.

The liquid solution was found by analysis to contain about 46.08 parts sodium hydroxide, about 0.21 part per million mercury.

EXAMPLE 6

Conditions were the same in Example 6 as in Example 1, except that the aqueous solution of sodium hydroxide was heated to about 25° C. before the aqueous hydrogen peroxide solution was admixed therewith.

The liquid solution was found by analysis to contain about 42.5 parts sodium hydroxide, about 1.50 parts per million mercury and about 0.2 part per million sulfur.

EXAMPLE 7

Conditions were the same in Example 7 as in Example 1, except that the solution was hand stirred at a temperature of about 100° C. for about 2 minutes.

The liquid solution was found by analysis to contain about 46.4 parts sodium hydroxide and about 0.50 part per million mercury.

What is claimed is:

1. A process for purifying an aqueous solution of an alkali metal hydroxide containing a soluble polysulfide complex of mercury and having an alkali metal hydroxide concentration in the range from about 25 to about 75% by weight, which comprises:
   (a) heating said solution to a temperature of at least 25° C.,
   (b) reacting an inorganic peroxide with said solution to precipitate solid particles of an oxide of said mercury in said solution, and
   (c) separating said solid particles from said solution.

2. The process of claim 1 wherein said alkali metal hydroxide is sodium hydroxide.

3. The process of claim 2 wherein said inorganic peroxide is hydrogen peroxide.

4. The process of claim 1, wherein said alkali metal hydroxide is potassium hydroxide.

5. The process of claim 1, wherein said solution is heated to a temperature in the range from about 50° C. to about 125° C.

6. The process of claim 5, wherein said reaction period is in the range of from about 5 to about 15 minutes.

7. The process of claim 1, wherein said oxidizing agent is reacted with said solution for a reaction period in the range of from about 3 to about 20 minutes.

8. The process of claim 1 wherein the molar ratio of said inorganic peroxide to said complex of a mercury is in the range from about 8:1 to about 20:1.

9. The process of claim 8 wherein said soluble polysulfide complex is formed by reacting said mercury with a sulfur containing complexing agent selected from a group consisting of sulfur, sodium sulfide, potassium sulfide, and mixtures thereof.

10. The process of claim 9 wherein said alkali metal hydroxide is sodium hydroxide.

11. The process of claim 10 wherein said sulfur-containing complexing agent is sulfur.

12. The process of claim 11 wherein said inorganic peroxide is hydrogen peroxide.

13. The process of claim 12 wherein the molar ratio of said inorganic peroxide to said complex of a mercury is in the range from about 10:1 to about 12:1.

14. The process of claim 1 wherein the molar ratio of said inorganic peroxide to said complex of a mercury is in the range from about 10:1 to about 12:1.

* * * * *

UNITED STATES PATENT AND TRADEMARK OFFICE
CERTIFICATE OF CORRECTION

PATENT NO. : 4,333,913

DATED : June 8, 1982

INVENTOR(S) : Ronald L. Dotson and Edward P. Carr

It is certified that error appears in the above—identified patent and that said Letters Patent is hereby corrected as shown below:

Column 1, line 8, after "hydroxides" insert --(sometimes referred to as "metal hydroxides" hereinafter in the description and claims)--.

Column 1, line 35, after "a" delete "steam" and insert --stream--.

Column 3, lines 38-39, after "at" delete "atomspheric" and insert --atmospheric--.

Column 3, line 41, delete "organic" and insert --inorganic--.

Column 5, line 7, delete "alklai" and insert --alkali--.

Column 8, Claims 13 and 14, line 2 of each, after "of" delete "a".

Signed and Sealed this

Seventeenth Day of August 1982

[SEAL]

Attest:

Attesting Officer

GERALD J. MOSSINGHOFF

Commissioner of Patents and Trademarks